(12) United States Patent
Lehmberg et al.

(10) Patent No.: US 6,423,361 B1
(45) Date of Patent: *Jul. 23, 2002

(54) HEATED DILUTION WATER

(75) Inventors: Gregg Lance Lehmberg, Westfield; Martin John Spisak, Parlin; Steven Alphonse Gobbo, Secaucus; Meghan Mary Kemly-Ellingham, Harrington Park, all of NJ (US)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/500,850

(22) Filed: Feb. 9, 2000

Related U.S. Application Data

(60) Provisional application No. 60/119,837, filed on Feb. 12, 1999.

(51) Int. Cl.$^7$ .................................................. A23F 3/00
(52) U.S. Cl. ....................................................... 426/597
(58) Field of Search .......................................... 426/597

(56) References Cited

U.S. PATENT DOCUMENTS

| | | | |
|---|---|---|---|
| 4,478,939 A | | 10/1984 | Adler-Nissen et al. |
| 4,483,876 A | | 11/1984 | Petersen |
| 5,445,836 A | * | 8/1995 | Agbo et al. |
| 5,780,086 A | * | 7/1998 | Kirksey et al. |
| 6,024,991 A | * | 2/2000 | Lehmberg et al. |
| 6,036,982 A | * | 3/2000 | Lehmberg et al. |

* cited by examiner

*Primary Examiner*—Anthony J. Weier

(57) ABSTRACT

A method for preparing beverage strength tea from highly concentrated solutions is taught. The method involves heating a portion of the dilution water to a pre-selected temperature, mixing this heated water with the concentrate and then adding additional water at a lower temperature to form the final beverage strength product.

9 Claims, 3 Drawing Sheets

HEATED DILUTION WATER

This application claims the benefit of U.S. Provisional Application No. 60/119,837, filed Feb. 12, 1999.

This invention generally relates to a method for diluting highly concentrated brewed tea beverage solutions with water to form a final beverage while preserving the required clarity of the final beverage.

In many situations concentrated solutions of tea are desirable to simplify shipping and packaging costs and to deliver a beverage with brewed tea flavor without the actual requirement of having to freshly brew tea.

Dilute tea extracts, have been used in Food Service applications for years and relatively low concentration storage solutions have been employed, usually at a level of about 0.5% to 1.0% tea solids. There is no difficulty diluting these low concentration storage or tea extract solutions with water to form iced tea beverages. Generally the storage solutions are held at room temperature and mixed with cold water to form a beverage strength drink. In the case of iced tea, ice may then be added to form the final beverage.

Iced tea cannot be conveniently prepared by infusing traditionally manufactured tea leaves in cold water. Instead, the leaves are usually infused in hot water, removed, if necessary unless they are in a tea bag, and the beverage is then refrigerated until it is ready to consume. Alternately tea leaves, both loose and in bags, have been placed in water in sunlight to infuse slowly over a period of hours. A more convenient option is to prepare the iced tea beverage from a highly concentrated storage solution.

Shelf stable tea concentrates with high tea solids used to prepare these iced tea beverages are highly desirable and have several applications. These include: the ability to supply a brewed tea concentrate for uses in the Ready-to-Drink tea and Fountain tea products; as a tea concentrate product for retail sale; and as a preferred method of transporting tea solids. One advantage of the tea concentrate of the invention over a powder or a dilute tea extract is that better tea character is obtained. In addition, less energy is employed in manufacturing than for a powder and less weight and volume are needed for shipping a concentrate than for a dilute extract.

In the prior art, tea concentrates were considered to be physically unstable, which prevented their use in many tea products. However, it is believed that under certain conditions tea products made from tea concentrates have better quality (e.g., flavor, freshness, etc.) than powders and are more economical than tea powder or dilute tea extract. Therefore, it is highly desirable to have a shelf stable tea concentrate and consequently to have a method of preparing beverage strength iced tea of high quality and good clarity from these concentrates is also required.

If concentrated solutions of tea solids are diluted to form a final beverage with cold water it has been found that a significant amount of haze develops which renders the beverage unsightly. Accordingly a method for diluting high concentrations of tea to form a final beverage while preserving the clarity of the tea beverage is seen to be highly desirable.

It has now been discovered that acceptable clarity in preparing final beverages by dilution can be achieved if a selected amount of the dilution water is heated to a certain temperature. It has also been found that the quality of the dilution water is important.

In order to obtain an acceptable final beverage containing at least 0.2% tea solids a Hunter Haze Value of 50 or less in the final tea beverage must be achieved. The Hunter Haze Value is the value obtained on a Hunterlab DP 9000 Spectrophotometer at 60° F. in a 5 cm cell.

Thus, water temperature, as well as the quantity of water at a given temperature and water quality (hardness and alkalinity) can be used to control the clarity of a beverage produced by reconstituting a brewed tea concentrate when the beverage is chilled, for example for consumption.

It has been discovered that the use of a small amount of hot water to partially dilute a brewed tea concentrate will result in superior beverage clarity once the dilution is completed with cold water and the beverage is chilled. Higher temperatures of dilution water and a larger quantity of the heated dilution water directionally improve clarity. It has also been found that using low hardness water for the initial dilution will result in improved clarity.

In order to achieve the goal of shelf stable tea concentrates which can then be employed with the invention, selected amounts of carbohydrates such as sucrose, high fructose corn syrup, corn syrup, oligosaccharides and the like have been employed. High fructose corn syrup has been found to be the most effective carbohydrate.

Tea extracts from continuous or batch extraction using specified enzyme treated or extracted tea leaves (i.e., green, black and oolong tea) may be employed. The extracts are preferably centrifuged and then concentrated by, for example, evaporation. The carbohydrate is added either before or after evaporation and preferably after to achieve a final concentration of 12 to 20% (w/w) on a tea solids basis of the concentrate. A shear force is used to mix the concentrate. The stabilized concentrate is pasteurized, aseptically packed or preserved and acidified to a pH below 4.6, and stored at ambient temperature. Products made from the concentrate have a fresh brewed tea flavor and good clarity.

The concentrate used with the invention has a concentration of brewed tea solids of about 5% to 30%, preferably 12% to 20%, and employs a companion carbohydrate such as sucrose, or preferably, corn syrup, or high fructose corn syrup preferably with a DE of 42 or 55, so that the ratio of carbohydrate solids to tea solids is about 1 part carbohydrate to 1 part tea to about 2 or more parts carbohydrates to 1 part tea, and preferably, at least 1.5 parts carbohydrate to 1 part tea. The carbohydrate should be of a type and at a level such that it does not impart significant sweetness when the concentrate is diluted to the beverage strength drink. Other materials may also be used but the total solids (solute) concentration including tea, HFCS, or other carbohydrate, and any other additives such as acidulants, preservatives and colorants, if desired, to ensure stability is preferably at least about 45% or higher. Lower amounts may also be used of 30 to 45% but the stability will be affected. In order to insure the microbiological stability of the storage solution or "concentrate", a pH of about 4.6 or lower is used. This may contribute to the physical instability of the concentrate. Of course, if the tea concentrate is processed thermally and aseptically packaged, a higher pH such as the native pH of tea of about 5.0 or higher may be used instead of a pH of 4.6 or less.

The preferred preservatives are sorbate and benzoate, preferably sodium benzoate and potassium sorbate but any preservatives commonly used in tea beverage may be used. Typical beverage strength iced teas prepared from current fountain tea dilute extracts contain about 100–200 ppm each of sorbate and benzoate because of the lower amount of total solids in the extract of the art, but the concentrate of the invention which is roughly 20 times more concentrated reduces this level in the beverage strength to about 10 to 12 ppm. Lower amounts of preservatives in the final beverage are beneficial for taste.

The viscosity of the brewed tea concentrate of the invention is 10 to 200 centipoise as measured by a Brookfield LVT Viscometer with a #2 spindle at 60 rpm and 25° C. temperature. Further, this brewed tea concentrate must produce a "brewed" tea flavor as judged by trained tea tasters when diluted to a level of about 0.2% tea and must also have a Hunter haze value of 40 or less as measured on a Hunter DP9000 spectrophotometer in a 5 cm. cell.

Based on the solids concentration, including tea solids, HFCS or other carbohydrates and other desired ingredients, the specific gravity of the concentrate will vary between about 1.21 g/cc and about 1.32 g/cc.

Further, the concentrate of the invention must be made from real tea and must contain about 0.4% to 2.0% caffeine, about 3.0% to 11.0% flavanoids, and about 0.3% or higher gallic acid.

The shelf life and consequently the physical stability of the storage solution or "concentrate" must be at least about 9 weeks when stored at a temperature of about 70° F.

The tea extract used in the concentrate can be produced by any convenient process but it is especially preferred to employ tea with selected cell wall digesting enzymes such as viscozyme. The prepared tea will also be clarified by standard means but preferably in a centrifuge at native pH of 5.0 or below and at a solids concentration of 4 to 15%. As mentioned above, any process will be operative but to insure low haze and increased stability the process employing cell wall digesting enzymes is preferred.

Black teas, particularly those selected to have a low cream index and which produce highly colored infusions are essentially preferred for the concentrate but, of course, Green and Oolong teas may also be employed if appropriate care is taken.

Particularly preferred are tea concentrates prepared from black tea treated with a combined enzyme system of at least one cell wall digesting enzyme.

In particular these concentrates are prepared by treating tea leaf with an enzyme cocktail including selected cell wall lysis enzymes such as carbohydrases including cellulase and mascerase, for example, Viscozyme™ L obtainable from NOVO Industri A/S Denmark.

The enzymes are fed to a black tea/water slurry in an extractor at low temperature to obtain a tea extract slurry. The enzymes, if more than one is used, can be combined into a cocktail or can be fed to the extractor individually. The tea extract slurry containing the enzymes is then hot extracted to complete the extraction process and the tea leaf is separated from the tea extract. The tea extract is then preferably pasteurized. This heat treatment deactivates the enzymes. The extract may then be stripped if desired.

The stripped extract is optionally first concentrated and then cooled and clarified by centrifugation or other clarification methods such as filtration and the like. After clarification, the extract is then again concentrated, preferably by vacuum.

Generally about 5 to 20 parts and preferably 5 to 8 parts by weight of water based on the weight of tea leaf is heated to between about 70° F. and 145° F., preferably 120° F. to 140° F. The water is added to the tea leaf and an enzyme mixture consisting of any combination of cell wall lysis enzymes, for example carbohydrases such as cellulase, pectinase, and mascerase is metered continuously into the extractor. The extractor can be jacketed or insulated to aid in temperature control. The flow of tea leaf, water and enzymes through the extractor is preferably co-current. The length, diameter and flow rates of the system are such that they provide a minimum contact time of at least 20 minutes, preferably at least 60 minutes. The maximum is about 2 to 5 hours or more, depending upon the degree of extraction desired balanced against economics.

The resulting slurry can be separated into extracted tea leaf and extract or be sent on for further batch or continuous higher temperature extraction. The extract is then optionally aroma stripped by conventional means and adjusted to the desired solids level, cooled and centrifuged to remove insoluble material. The extract is then concentrated to about 30% tea solids or higher for batching with other ingredients to form the final storage solution or concentrate.

Enzyme Preparation

The enzyme cocktail, if more than one enzyme is used, is prepared by mixing selected cell wall-digesting enzymes together with enzyme stabilizing agents such as sorbitol and the like in water. Then enzymes may be mixed together. It is also possible to introduce the enzyme separately into the extractor.

Enzyme Extraction Operation

The tea leaf is fed to the enzyme extractor together with fresh water and enzyme solution. All three components flow co-currently through the extractor. Other methods of delivering an appropriate residence time are also acceptable. The extractor is preferably temperature controlled by jacketing or the like.

The enzyme extractor preferably provides about 20 minutes to about 5 or more hours of residence time for the enzyme solution to be in contact with the leaf. Temperature control is important to maximize the effect of the enzymes.

Extraction

Following the enzyme extraction step, the leaf slurry is fed into an extractor at a temperature of about 70° F. to 210° F., preferably 100° F. to 190° F. This completes the extraction of the leaf. The ratio of leaf to water in this extraction is about 4 parts to 10 parts water to 1 part leaf.

Pasteurization

If pasteurization is desired, decanted extract from the hot extraction step is pumped at about 2% to 5% tea solids to the Pasteurizer. Pasteurization is accomplished by raising the temperature of the extract to a minimum of about 190° F. The hot extract is then held for about one to ten minutes of residence time to destroy any microorganisms that might be present in the extract. The pasteurization step also denatures the enzymes and stops their activity.

The pasteurized extract is then stripped of aroma if desired and concentrated to the appropriate level for centrifugal clarification.

Centrifuge Operation

The extract temperature should be about 140° F. or less, preferably about 55° F. to 90° F. The extract is fed to a centrifuge where it is spun for nominally 2 minutes at approximately 8,000 times gravity. The sludge is disposed of and the clarified extract retained for concentration. The extract is centrifuged at about 4% to about 15% tea solids at a pH of about 5.0 or less.

Preferred Embodiment

In a preferred process of this invention, black tea leaf is mixed with an enzyme cocktail at a weight ratio of from about 0.005 to 0.010 part of enzyme to 1 part of tea leaf preferably 0.007 to 0.008 parts enzyme per part tea leaf. The enzyme solution contains one or more cell lysis enzymes. Preferably, the enzyme solution contains from about 0.33 to 0.66 FBG of carbohydrase per gram of black tea. The tea is extracted with the enzymes at a temperature of from 70° F. to about 145° F. for from 20 minutes to 5 hours or more. The enzymes are inactivated by heating to a temperature greater than about 150° F. and preferably about 190° F. or above and the tea is then ready for further processing in accordance with the invention. Conventional extraction, aroma stripping, pasteurization and centrifugation are employed.

Enzyme Solution

By "cell wall-digesting enzyme" herein is meant an enzyme or enzymes which breaks down one or more tea cell wall constituents to simpler materials and thus reduces the structural integrity or increases the permeability of the cell wall. Plant cell walls are composed primarily of cellulose, but contain lesser amounts of proteins, hemicellulose, pectins, and lipids. Accordingly, cell wall-digestive enzymes include carbohydrases such as cellulase, hemicellulase, pectinase and dextranase as well as protease, lysozyme and lipases, for example, NOVO Industries' U.S. Pat. Nos. 4,478,939 and 4,483,876 describe SPS-ase activity. The cell wall digesting enzymes, such as cellulase, pectinase, and hemicellulase can be obtained from commercial enzyme sources.

One cell wall digesting enzyme is Viscozyme™ L obtainable from NOVO. Viscozyme 120 L is a multi-enzyme complex containing a wide range of carbohydrases including arabinose, cellulase, β-glucanase, hemicellulase and xylanse. The enzyme also has activity against the branched pectin like substances found in the soy bean cell walls.

The enzyme preparation is produced from a selected strain of the Aspergillus group. The product has an enzyme activity of 120 FBG/ml. (Fungal β-Glucanase). The analytical method is available from NOVO.

Once the clarified tea extract has been prepared by the enzymatic treatment, it is then concentrated by means well known in the art. Preferably the concentrates are prepared by evaporation under vacuum. The preferred conditions if evaporation is used are a temperature of about 115° F. to 195° F. and a pressure of about 1.5 psia to about 10 psia. In this way the extract can be concentrated without having a negative impact on the organoleptic properties of the tea. A commercial rising or falling film evaporator is usually employed. Once the tea is concentrated to an appropriate level, a selected carbohydrate is then added to stabilize the concentrate.

The tea extract can be concentrated to any level which is high enough to achieve the desired tea solids concentration in the final storage solution or concentrate and low enough to still be fluid enough to be workable. Levels of about 30% or higher and preferably about 45% or higher to about 70% are preferred for ease of handling.

As used herein, the terms "tea concentrate solution" refers to a product derived from concentrated tea extract which is diluted with water to form a drinkable tea beverage. Tea concentrates of the present invention comprise from about 5% to about 30% tea solids. Preferred tea concentrates of the present invention comprise from about 12% to about 20% by weight tea solids. The tea concentrates of the present invention are in liquid product form.

As used herein, the term "tea beverage" refers to a drinkable beverage prepared from the tea concentrates of the present invention by dilution with water. The dilution water is usually municipal water but deionized water can be used to advantage. If the municipal water has a hardness of over about 200 ppm as $C_aCO_3$, the haze of the beverage may be adversely affected so caution is required. Concentrates of the present invention are generally diluted with sufficient water to provide the tea beverage. Preferred tea concentrates are typically diluted to about 0.1% to 0.35% tea solids to provide the tea beverages.

As used herein, the term "tea solids" refers to those solids normally present in a tea extract. Polyphenolic compounds are normally the primary component of tea solids. However, tea solids can also include caffeine, proteins, amino acids, minerals and carbohydrates.

As used herein, the word "comprising" is intended to mean including but not necessarily "consisting essentially of", "consisting of" or "composed of". In other words, "comprising" the listed steps or options need not be exhaustive.

Except in the examples, or where otherwise explicitly indicated, all numbers in this description indicating amounts of material or conditions of reaction, physical properties of materials and/or use are to be understood as modified by the word "about." All amounts are by weight of the composition, unless otherwise specified.

EXAMPLE 1

Tests were run on a tea concentrate containing the following approximate composition.

| | | |
|---|---|---|
| Tea concentrate | 40% | (50% tea solids) |
| HFCS DE 42 | 56% | (71% of HFCS solids) |
| Preservative | | |
| Sodium benzoate | 0.1% | |
| Potassium sorbate | 0.14% | |
| Deionized water | 0.4% | |
| Stabilizer | | |
| Carrageenan gum | 0.03% | |
| Water | 3.6% | |
| Acidulant | | adjust to pH 4.2 |
| (eg. Phosphoric acid) | | |
| | 100.0% | |

The tests were run to show the effect of adding heated water at various percentages before effecting a full dilution.

Figure 1:
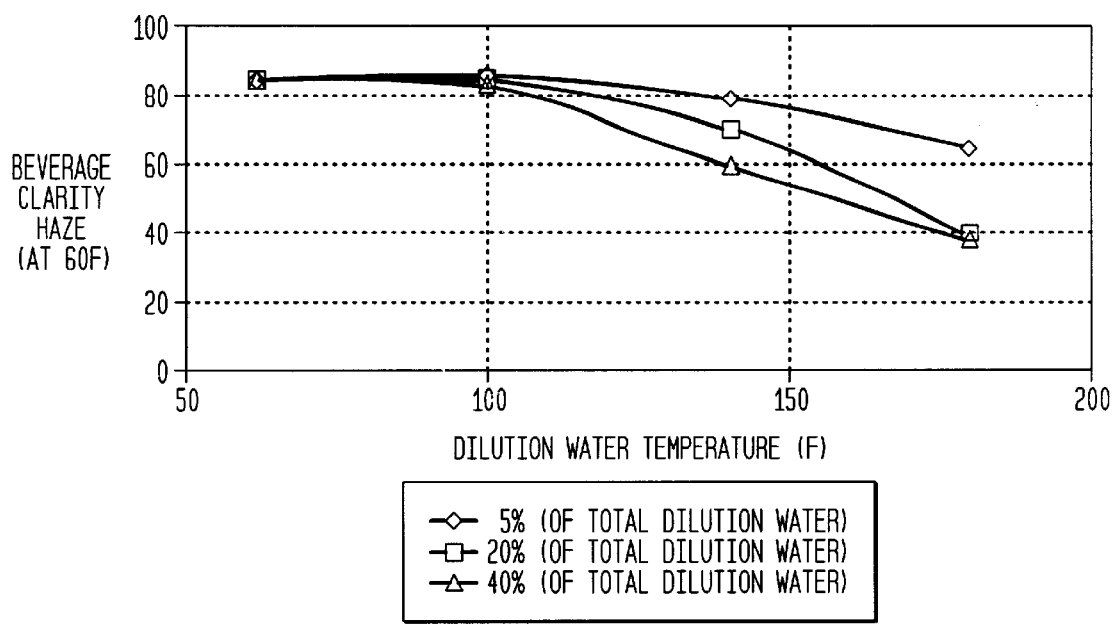
FIG. 1 shows the results of testing with regard to beverage clarity as it relates to the dilution water (synthetic hard) temperature.

In the initial test, a full dilution factor of 60° F. synthetic hard water (178–180 ppm as CaCO₃) at a level of 1 part tea concentrate to 100 parts water was added. A haze value of 84 was obtained. Additional tests were run using differing amounts of dilution water, both synthetic hard water and deionized water at differing temperatures and percentages. In all cases, after dilution, the samples were cooled to 60° F. using an ice water bath before the haze values were measured. These results are reported in Table 1 below and appear in FIG. 1 for Synthetic Hard Water and FIG. 2 for Deionized Water.

TABLE 1

(FIGS. 1 & 2)
Haze Values

| Percentage of | Deionized Water | | | Synthetic Hard Water | | |
|---|---|---|---|---|---|---|
| Heated Diluton Water | 5% | 20% | 40% | 5% | 20% | 40% |
| 60 F. | 83.8 | 83.8 | 83.8 | 83.4 | 83.4 | 83.4 |
| 100 F. | 84.9 | 82.7 | 76.5 | 84.3 | 83.2 | 81.5 |
| 140 F. | 83.5 | 52.3 | 37.7 | 78.6 | 69.0 | 58.6 |
| 180 F. | 63.7 | 21.9 | 18.1 | 63.5 | 37.6 | 36.5 |

Figure 2:
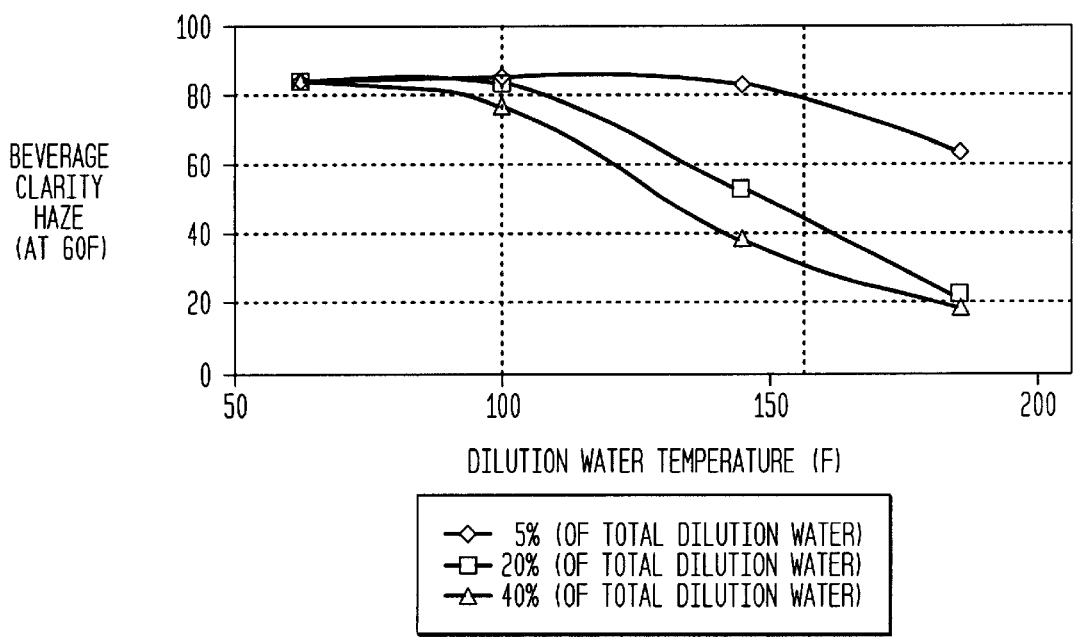
FIG. 2 shows the results of testing with regard to beverage clarity as it relates to the dilution water (deionized) temperature.

The most efficient use of heating energy is to heat about 10% or more, preferably about 20% of the dilution water to a temperature of about 140° F. or higher, preferably 160° F. or higher, mix the concentrate with this water and then complete the dilution to 1 part concentrate to 100 parts water using water at 60° F. or below. The use of deionized water presents a final beverage having better haze values, as shown in FIG. 2.

Further evidence of the importance of using hot water for dilution is the following. A sample diluted with 60° F. synthetic hard water (as mentioned above) and with a haze value of 84 was heated to 180° F. using a microwave oven. The sample was then cooled to 60° F. and a haze value of 58 was obtained. This is significantly higher than when 20% of the water is heated to 180° F. and used for dilution, which results in a haze value of 38.

EXAMPLE 2

Figure 3:
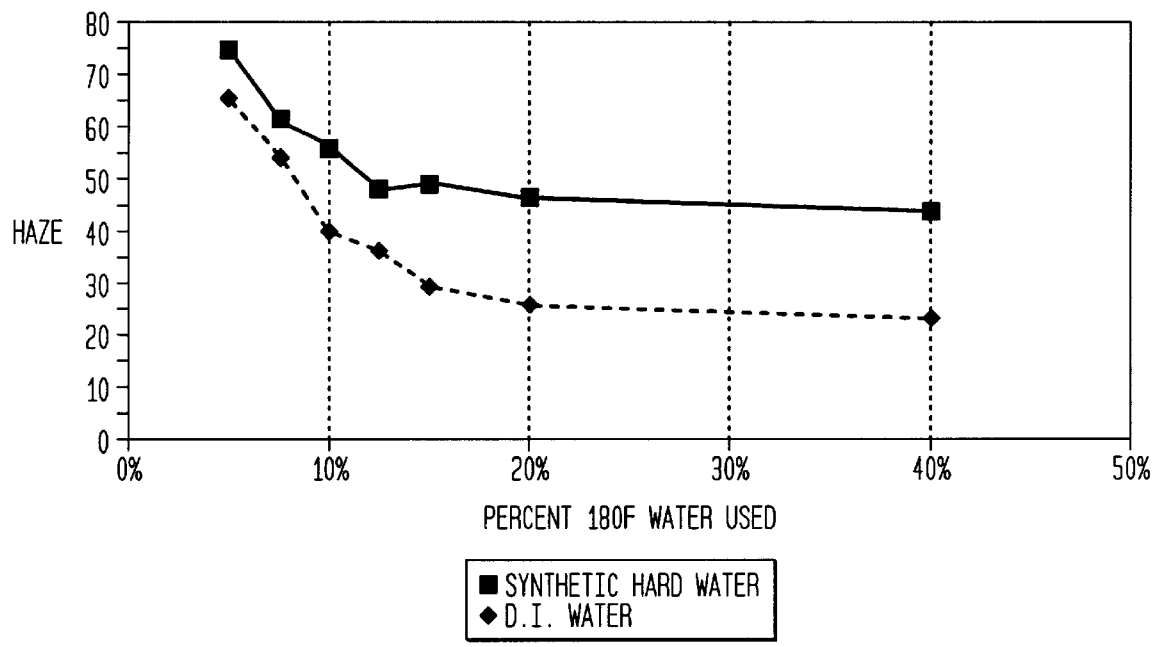
FIG. 3 shows the results of testing with regard to beverage haze as it relates to the percentage of hot dilution water employed.

In FIG. 3, using the same tea concentrate as in Example 1, de-ionized water is compared to synthetic hard water. This shows that significant improvements in haze begin when the amount of hot water (180° F.) for dilution reaches about 10% or higher. De-ionized water produces a significantly lower haze beverage than synthetic hard water.

The tests are run using either synthetic hard water (178–180 ppm as CaCO₃) or de-ionized water at 180° F. The water is added at differing amounts to dilute the tea concentrate as in Example 1. The remaining water at 60° F. is added to the diluted concentrate to bring the total water to 100 parts water to 1 part of tea concentrate. The samples were cooled to 60° F. for haze measurements in a Hunter 9000 spectrophotometer in a 5 cm cell.

Figure 4:
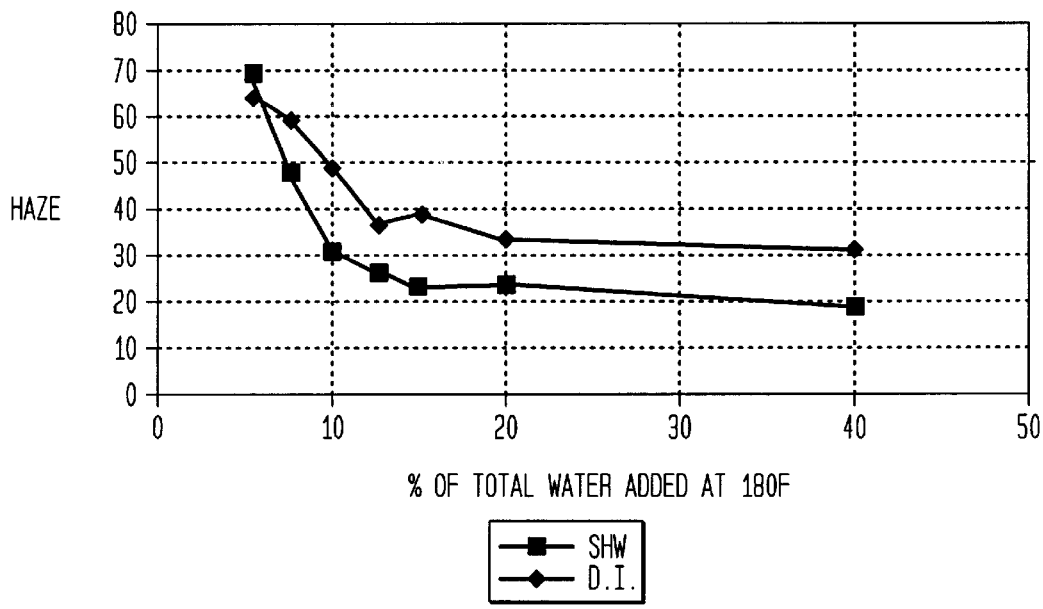
FIG. 4 shows the results of testing with regard to beverage haze as it relates to the amount of 180F water used for initial dilution.

FIG. 4 shows the variation of haze with percentage of water added at 180°. This reduced haze effect appears to level off some above a certain percentage dilution.

EXAMPLE 3

Figure 5:
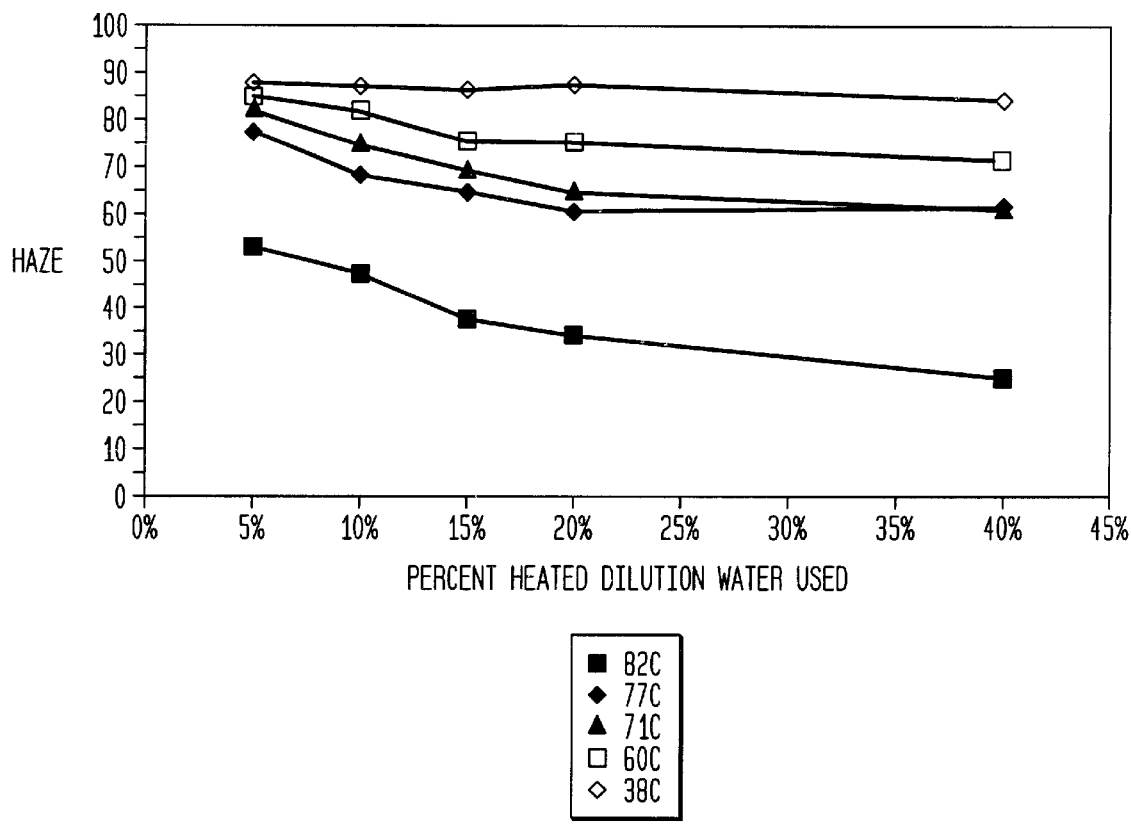
FIG. 5 shows the results of testing with regard to beverage haze as it relates to the percentage of heated dilution water.

In FIG. 5, the haze versus the percentage of heated dilution water is measured at varying temperatures. The dilution is with synthetic hard water. The results are reported below in Table 2. The haze was measured in the usual way on beverage strength tea having 0.2% tea solids. The additional water added to the dilution was at 15° C. (or 60° F.).

TABLE 2

(FIG. 5)
Haze At Selected Temperatures

| % heated water used | 82 C. 15 C. (SHW) | 77 C. 15 C. (SHW) | 71 C. 15 C. (SHW) | 60 C. 15 C. (SHW) | 38 C. 15 C. (SHW) |
|---|---|---|---|---|---|
| 5.0% | 53.3 | 77.7 | 82.3 | 84.7 | 87.2 |
| 10.0% | 47.6 | 68.5 | 74.9 | 82.2 | 87.3 |
| 15.0% | 37.4 | 65.0 | 69.7 | 75.6 | 86.6 |
| 20.0% | 34.1 | 60.8 | 64.7 | 75.3 | 87.6 |
| 40.0% | 24.4 | 61.4 | 60.8 | 71.3 | 84.2 |

Figure 6:
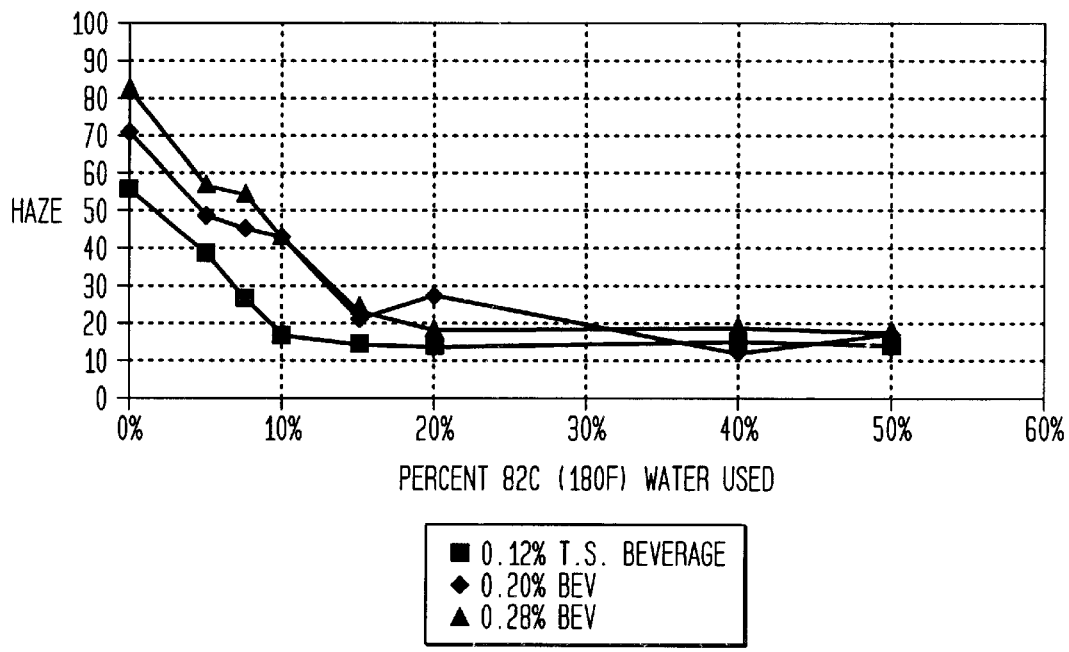
FIG. 6 shows more results of testing with regard to haze as it relates to the percentage of heated dilution water.

In FIG. 6, the haze versus the percentage of heated dilution water is compared at a single temperature for varying concentrations of beverage. The haze appears to depend on the temperature and to be relatively independent of the amount of tea solids in the beverage.
The results are reported in Table 3 below.

TABLE 3

| % 180 F. water used | 0.12% t.s. bev 15 C. (SHW) | 0.20% t.s. bev 15 C. (SHW) | 0.28% t.s. bev 15 C. (SHW) |
|---|---|---|---|
| 0.0% | 55.3 | 70.9 | 82.4 |
| 5.0% | 38.1 | 48.3 | 56.9 |
| 7.5% | 26.3 | 45.1 | 54.2 |
| 10.0% | 16.1 | 42.5 | 42.3 |
| 15.0% | 13.9 | 20.6 | 23.1 |
| 20.0% | 13.3 | 26.9 | 17.8 |
| 40.0% | 14.4 | 11.3 | 18.3 |
| 50.0% | 13.6 | 16.4 | 16.7 |

The synthetic hard water used herein and in the examples is a standard version having about 178 to 180 ppm as CaCO₃.

While not wishing to be bound by theory it is nonetheless theorized that a certain temperature of the mix must be attained during initial mixing. This is achieved using at least a certain amount of water at a certain minimum temperature. Results are also influenced by the quality of the water. This is demonstrated by the fact that adding cold water to the concentrate and then heating the mix does not give good clarity.

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A method of diluting a concentrated aqueous tea solution containing about 10% to 30% tea solids to an aqueous based beverage containing about 0.1% to 0.35% tea solids comprising the steps of, contacting at least one part of the concentrated aqueous tea solution with an initial dilution of from at least 10% of total dilution water at a temperature of about at least 140° F.; adding a remainder of the total dilution water at a temperature of 60° F. to form a final beverage having at least 0.1% to 0.35% tea solids and a Hunter Haze Value of 50 or less at 60° F. as measured in a 5 cm cell.

2. The method as defined in claim 1 wherein said concentrated tea solution contains about 12% to about 20% tea solids and wherein the dilution to the final beverage employs about 1 part of tea concentrate to 100 parts of water.

3. The method as defined in claim 1 wherein said concentrated tea solution contains about 17% tea solids.

4. The method as defined in claim 1 wherein said concentrated tea solution has a total solids concentration of at least about 45% and contains a carbohydrate in a ratio of about 1 part carbohydrate to 1 part of tea to 2 parts or more carbohydrate to 1 part of tea.

5. The method as defined in claim 4 wherein said carbohydrate is selected from the, group consisting of high fructose corn syrup, corn syrup, oligossaccharides and mixtures of these.

6. The method as defined in claim 1 wherein deionized water is used for the initial dilution.

7. The method as defined in claim 1 wherein deionized water is used to prepare the concentrate.

8. The method as defined in claim 1 where at least one part of the concentrate is contacted with at least about 20% to 40% of a final dilution amount of water at a temperature of at least about 160° F.

9. The method as defined in claim 1 wherein deionized water is used for the remainder.

* * * * *